(12) United States Patent
Alexander

(10) Patent No.: US 7,717,662 B2
(45) Date of Patent: May 18, 2010

(54) UTILITY TRUCK COMBINED WITH HOIST, LIFT OR CRANE ELEMENTS

(76) Inventor: Larry Alexander, 8750 Pendleton Pike, Indianapolis, IN (US) 46226

( * ) Notice: Subject to any disclaimer, the term of this patent is extended or adjusted under 35 U.S.C. 154(b) by 459 days.

(21) Appl. No.: 11/801,887

(22) Filed: May 11, 2007

(65) Prior Publication Data

US 2008/0279668 A1 Nov. 13, 2008

(51) Int. Cl.
*B60P 1/48* (2006.01)
(52) U.S. Cl. .................. 414/546; 296/183.1; D34/34
(58) Field of Classification Search .............. 296/37.6, 296/183.1; 414/541, 542, 546; D34/34, D34/37
See application file for complete search history.

(56) References Cited

U.S. PATENT DOCUMENTS

| | | | | | |
|---|---|---|---|---|---|
| 3,276,610 | A | * | 10/1966 | Thatcher | ................. 414/541 |
| 4,058,229 | A | * | 11/1977 | Triplett | ................. 414/546 |
| 4,265,585 | A | * | 5/1981 | Hawkins | ................. 414/541 |
| 4,383,791 | A | * | 5/1983 | King | ................. 414/542 |
| 4,473,334 | A | * | 9/1984 | Brown | ................. 414/563 |
| 5,839,775 | A | * | 11/1998 | Young et al. | ............. 296/182.1 |
| 6,183,042 | B1 | * | 2/2001 | Unrath | ................. 296/187.11 |
| 6,799,935 | B1 | * | 10/2004 | Grollitsch | ................. 414/546 |
| 7,070,227 | B2 | * | 7/2006 | Hunt | ................. 296/183.1 |
| 7,189,048 | B2 | * | 3/2007 | Rinderknecht | ............. 414/546 |

* cited by examiner

*Primary Examiner*—James Keenan
(74) *Attorney, Agent, or Firm*—Daniel O'Connor

(57) ABSTRACT

A utility truck is specially modified in order to accommodate a lift, hoist or crane unit. Portions of the utility truck elongated lateral tool boxes and compartments are cut out and shelving is provided to support the lower portions of the lift or crane. The design allows a load such as a large electrical or telephone box to be transported and unloaded by a single operator. The design enables protection from the harsher winter conditions of colder parts of the earth such as the north U.S. and Canada.

1 Claim, 5 Drawing Sheets

UTILITY TRUCK COMBINED WITH HOIST, LIFT OR CRANE ELEMENTS

BACKGROUND AND OBJECTS OF THE INVENTION

The present invention is generally related to the crane, lift or hoisting arts and, in particular, to the application of such arts in combination with a utility truck or a service vehicle.

As is known in the art, utility trucks or service vehicles comprise a low-riding, heavy duty vehicle with larger side tool and equipment boxes.

Utility trucks are of the type utilized by electric power companies, telephone companies and many other equipment service and replacement organizations.

In addition to normal installation and repair duties, utility trucks are often called into service during or in the aftermath of serious weather conditions such as snow storms, blizzards, tornados, hurricanes and the like.

Utility trucks are often utilized when new electric power equipment or telephone equipment must be installed as rapidly and efficiently as possible to restore critical power and telephone services to customers on line.

Accordingly, it is an object of the present invention to describe a utility truck capable of carrying and unloading a new equipment box without the need for a separate unloading crane, lift or hoist unit.

It is a further object of the invention to set forth a utility truck having top portions of the lateral tool boxes cut out to accommodate a specially designed hoist or lift apparatus.

It is a further object to describe a combined utility truck and hoist/lift system in which the hoist or lift is provided with a solid mounting base and is positioned for maximum lifting capabilities. The described system and method also enables the loading of a damaged or non-functioning equipment box onto a utility truck for removal as needed.

These and other objects and advantages of the present invention will be appreciated by those of skill in the utility and service truck arts.

PRIOR ART PATENTS AND DESIGNS

During the course of preparing this specification for submission to the U.S. Patent Office, a full search of the prior art was conducted.

U.S. Pat. No. 5,725,112 teaches the use of a crane in combination with a utility truck. The design has a single lower mounting base shown at numeral 2.

U.S. Pat. No. 6,799,935 teaches the use of a lifting apparatus in the bed of a pickup truck. A particular mounting configuration and method of operation is described.

U.S. Pat. No. 6,616,397 describes a hoist system and method of use wherein hoist component parts are separable and broken down for storage in the truck bed when not in use.

The present invention is described and claimed so as to clearly define over all prior art teachings known to those in the utility truck and related crane industries.

SUMMARY OF THE INVENTION

A utility truck rear assembly is shown as having a front wall, a bed and a left side tool box area.

The utility truck rear assembly further includes a right side tool box area.

A lift installed in the utility truck rear area includes a lower hydraulic drive and an angled support for an upper lift section.

Support areas are cut out in both the left side tool box area and the right side tool box area.

The cut out support areas include a first and forward horizontal support and a second, rearward horizontal support.

The first and second horizontal supports are connected by an angled support portion.

The cut out design provides for enhanced stability of the overall lift system and also provides for protection from weather elements for enhanced performance and extended life of the system.

BRIEF DESCRIPTION OF THE DRAWING FIGURES

FIG. 3 shows the cut out portions of the lateral tool boxes which enable a hoist or lift unit to be nestled within the confines of the utility truck assembly without taking up load space.

FULL DESCRIPTION OF THE PREFERRED EMBODIMENTS

Figure 1:
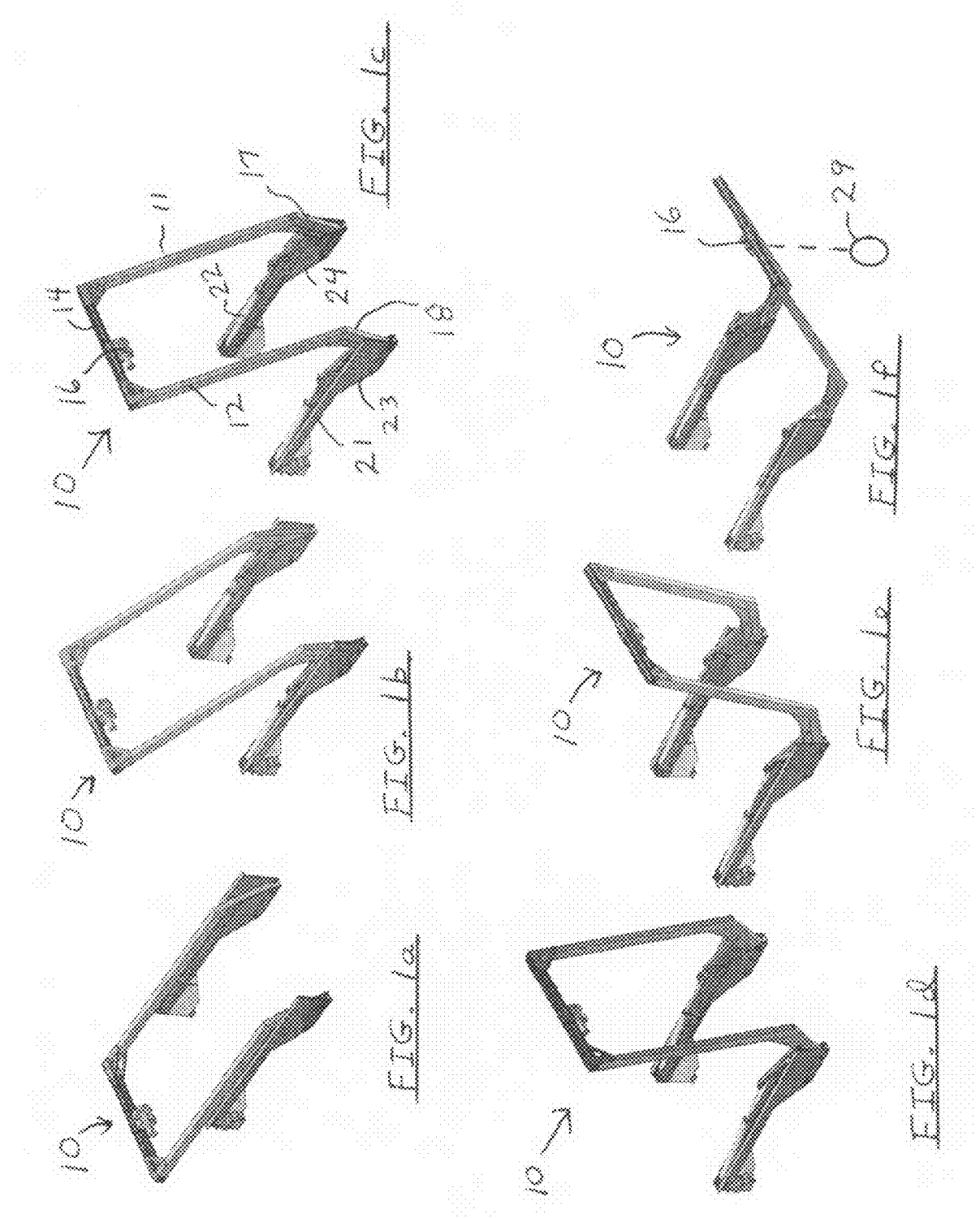
FIGS. 1a through 1f show a hydraulically driven lift, hoist or crane unit in various possible positions from the in or lowered position of FIG. 1a to the fully extended or out position of FIG. 1f.

Referring to the drawing figures, FIGS. 1a through 1f show a lift, hoist or crane unit 10.

The various components are numbered in FIG. 1c as follows:

a pair of arms 11 and 12 are connected by a cross-arm indicated at numeral 14;

the lower ends of arms 11 and 12 have angled rocker elements 17 and 18;

numerals 21 and 22 indicate lower support and drive elements;

the ends of the drive elements are shown at numerals 23 and 24 as angled to receive the angled upper rocker elements;

a winch unit is shown at numeral 16.

The winch unit 16 is utilized to pick up a load 29 as indicated in FIG. 1f.

As indicated in the progression of FIGS. 1a through 1f, the upper arms 11,12 and the cross member 14 are driven through various angles from zero degrees in FIG. 1a to about 135 degrees in FIG. 1f.

Figure 2:
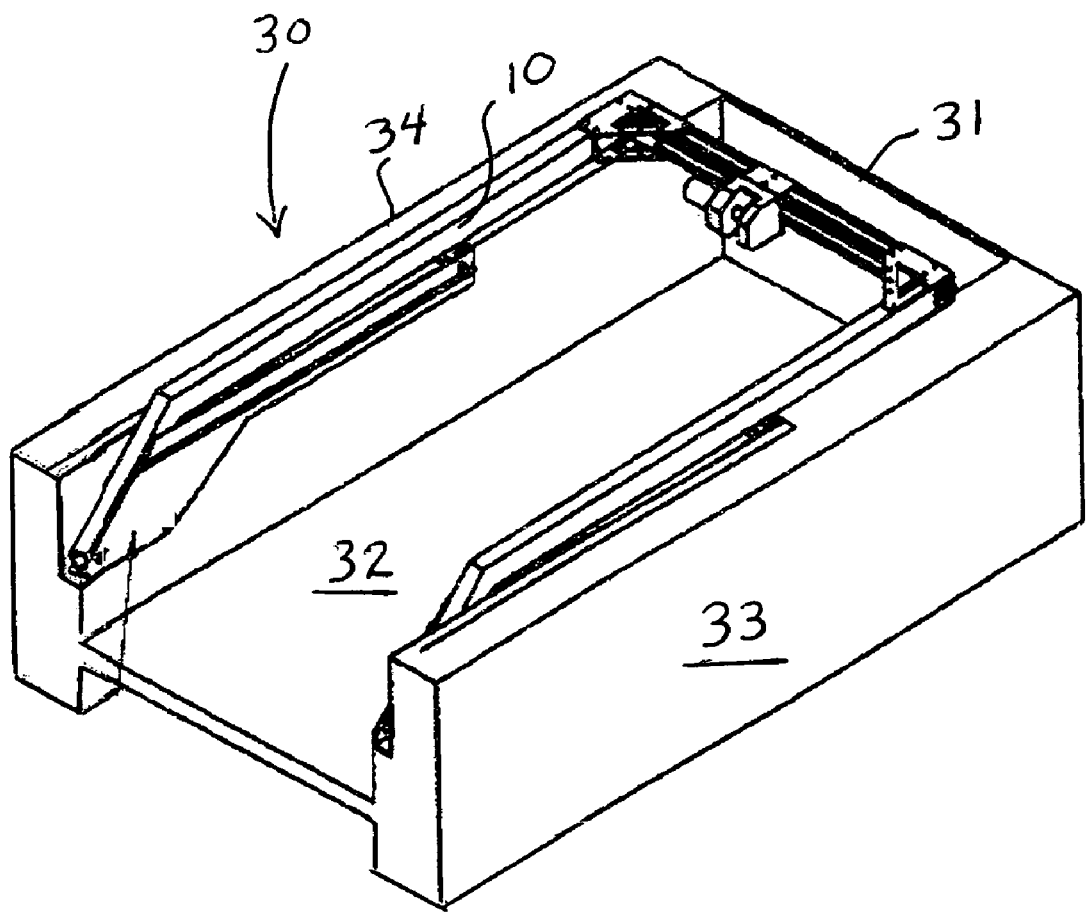
FIG. 2 shows the lift or hoist unit 10 as installed in combination with a utility truck rear assembly unit 30.

Referring to FIG. 2, the lift assembly 10 is placed on and attached to a utility truck rear assembly as indicated generally by numeral 30.

Unit 30 has a front wall 31, a bed area 32 and lateral elongated tool boxes or compartments shown at numerals 33 and 34.

Figure 3:
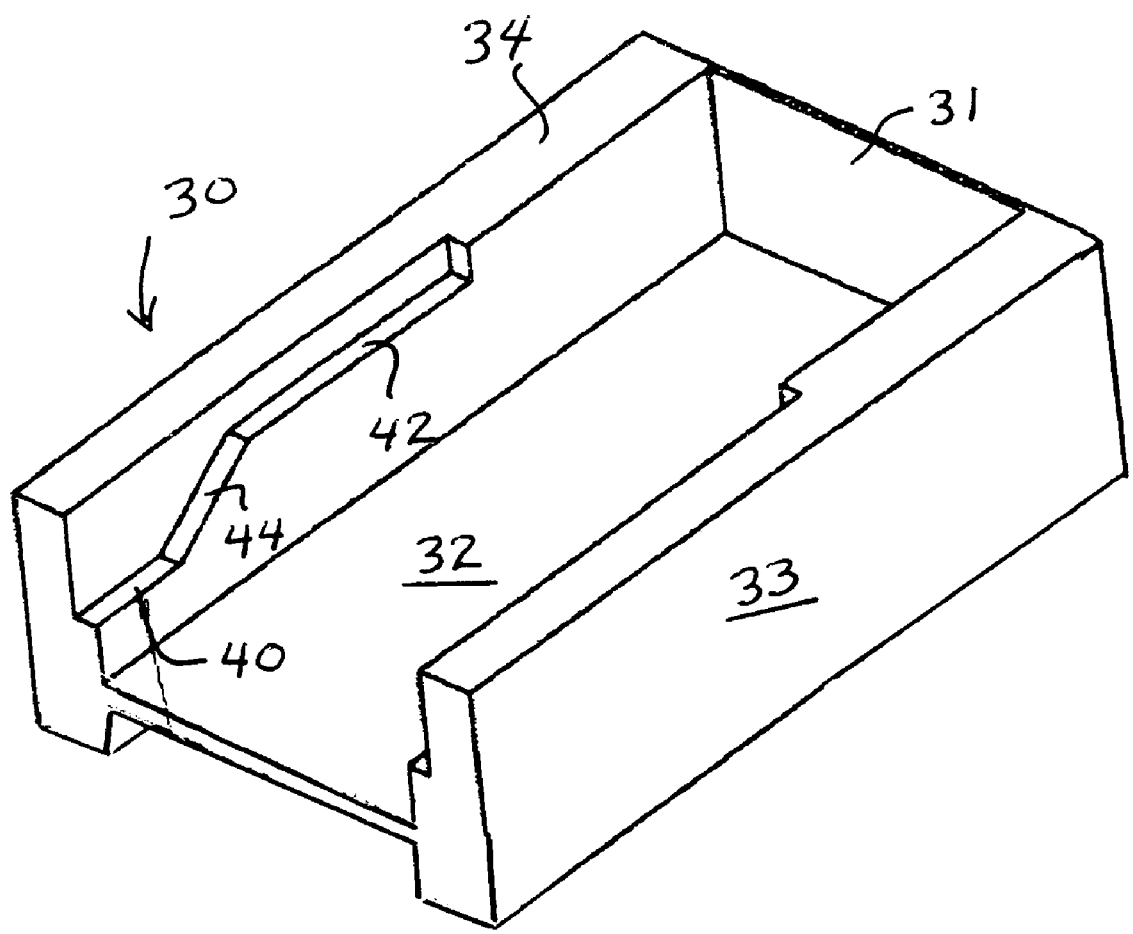
FIG. 3 shows the utility truck rear assembly unit 30 without the lift or hoist.

Referring to FIG. 3, it is seen that the left tool box compartment 34 has portions thereof cut out along the lines as follows:

a lower horizontal interior shelf 40, an upper horizontal interior shelf 42, and an angled interior shelf 44 which extends between and connects the horizontal shelves 40 and 42.

Figure 4:
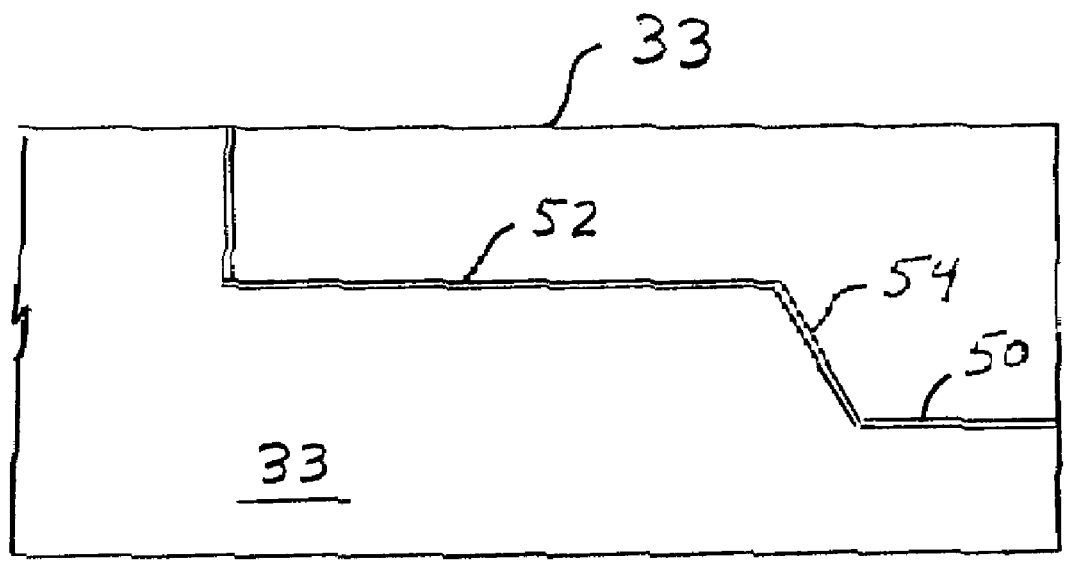
FIG. 4 shows the cut out shelves also formed in the right hand lateral tool box 33.

Referring to the schematic drawing of FIG. 4, it is seen that the tool box compartment 33 also has shelves cut therein as indicated at numerals 50, 52 and 54.

These shelves 50, 52 and 54 are the mirror image of the shelves 40, 42 and 44 and thus serve to support the lift unit 10 in a nestled or tucked-in manner in relation to the utility truck assembly 30.

Figure 5:
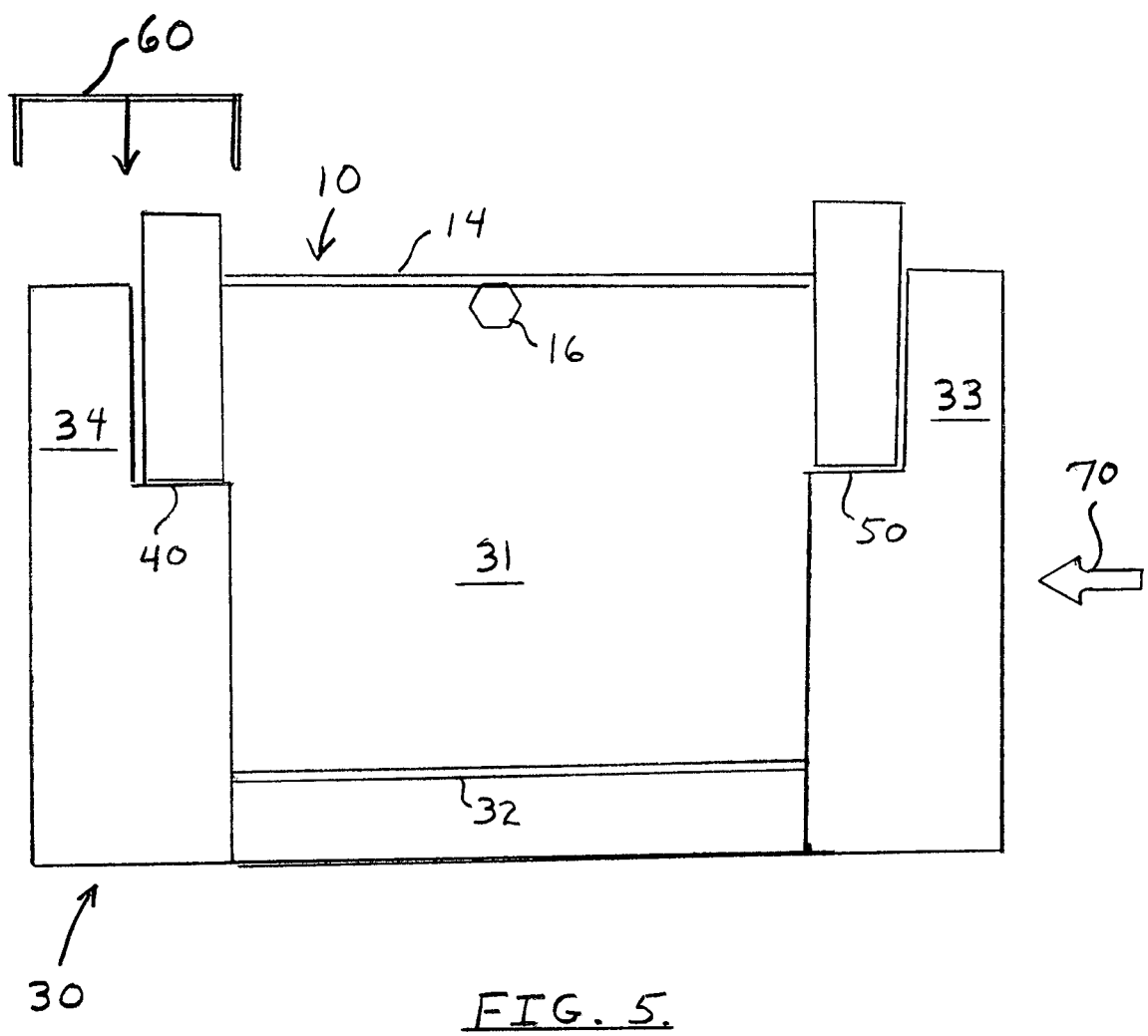
FIG. 5 is a rear view of the combined hoist, lift or crane 10 in combination with the utility truck rear assembly 30. The shelving and internal protected position of the lift or hoist are illustrated.

Referring to the end rear view of FIG. 5, the lift unit 10 is shown as nestled within the confines of the utility truck 30.

The cut out portions of the tool boxes 33 and 34 are also indicated in the rear view of FIG. 5, as are the rear horizontal shelves 40 and 50. Elements 14 and 16 of the lift unit 10 are also shown.

The particular overall arrangement of the lift unit 10 in combination with the utility truck 30 achieves a maximum amount of support and protection for the lift unit.

The arrangement shown allows a protective cover or cap 60 to be placed over side walls and lift portions to prevent exposure to harsh weather conditions when in storage or in transit to a work site.

The overall system is thus highly advantageous in such climates extant in the northern United States, Canada, northern Europe, northern Asia and Russia.

Protection from the snow and wind elements in such climates is readily achieved.

The method steps involved in practice of the invention are as follows:

a) providing a utility truck rear assembly having a front wall, a bed area and lateral elongated tool box compartments, b) cutting out interior portions of said elongated tool boxes to provide shelving areas, wherein the cut out areas comprise two horizontal shelving spaces and an angled shelving space between the horizontal shelves, c) providing a lift, hoist or crane having two upper arms and a cross-arm element having a winch mounted thereon, said lift having two lower support elements including hydraulic drive means, d) positioning said lift, hoist or crane on said utility truck rear assembly so the lift is supported on the shelves formed on the interior tool box walls.

Suitable attaching means of types known in the art would of course be utilized to fasten the lift to the utility truck.

CRITICAL ADVANTAGES OF THE INVENTION

Referring to the arrow 70 in FIG. 5, such represents a condition related to heavy wind and snow which is often encountered by the utility truck and operating personnel.

The tucked-in or nestled structure provided for the lift or hoist enables its drive mechanism to be shielded from the adverse weather elements.

The invention is thus highly useful in colder climates such as Canada and other northern regions of the earth.

Referring to FIG. 2, the unique positioning of the lift or crane components around the bed 32, rather than being mounted to the bed as for example in the cited prior art patent, enables a larger load to be safely carried in the bed of the utility truck. The lift, crane or hoist can thus be left on the utility truck on a permanent basis without the need for time-consuming removal and re-installation.

While a particular system and method of use have been shown and described, it is intended in this specification to include all equivalent systems and methods which would reasonably occur to those of skill in the art.

The invention is further defined by the claims appended hereto.

I claim:

1. A method of transporting and delivering a load by means of a utility truck assembly comprising the steps of:
    a) providing a utility truck assembly comprising lateral elongated tool box compartments (33,34) with interior and exterior portions,
    b) cutting shelving elements into only the interior portions of said lateral tool box compartments,
    c) placing a lift or hoist including a winch on said shelving elements,
    d) moving a load via the lift or hoist from a bed of the utility truck assembly to a position behind the utility truck assembly,
        wherein each of the shelving elements are formed as follows;
        a first horizontal rearward shelf (40),
        a second horizontal and forward shelf (42) which is positioned higher than said first horizontal rearward shelf (40),
        a third angled shelf (44) which is positioned between said first and second horizontal shelves,
    e) providing a cap (60) which fits over portions of the tool box compartments and the lift or hoist.

* * * * *